United States Patent
Rosen

[11] Patent Number: 6,167,130
[45] Date of Patent: Dec. 26, 2000

[54] CONDITIONAL AUTODIALER

[76] Inventor: Howard B. Rosen, 1 Lyncroft Rd., Montreal, Quebec, Canada, H3X 3E3

[21] Appl. No.: 08/962,511

[22] Filed: Oct. 31, 1997

[51] Int. Cl.[7] .................................................. H04M 1/272
[52] U.S. Cl. .............................. 379/355; 379/38; 379/216
[58] Field of Search .................................. 379/355, 354, 379/356, 216, 357, 37, 40, 38, 52, 45, 51

[56] References Cited

U.S. PATENT DOCUMENTS

| 4,802,208 | 1/1989 | Yeh. | |
|---|---|---|---|
| 5,465,297 | 11/1995 | Azem | 379/40 |
| 5,475,751 | 12/1995 | McMonagle, Jr. et al. | 379/40 |
| 5,493,604 | 2/1996 | Hirayama. | |
| 5,673,304 | 9/1997 | Connor et al. | 379/38 |
| 5,768,363 | 6/1998 | Dautartas et al. | 379/418 |

OTHER PUBLICATIONS

Eubank, C. H., "Programmed one–number telephones place calls automatically", Bell Laboratories Record, May 1971, USA, vol. 49, No. 5, pp. 135–138.

Primary Examiner—Wing F. Chan
Attorney, Agent, or Firm—David T. Bracken

[57] ABSTRACT

A conditional autodialer coupled to a telephone line is adapted to selectively automatically dial a predetermined telephone number, after a predetermined delay period following the appearance of an on-hook to off-hook transition on the telephone line. The autodialer includes an off-hook detector, a touch tone detector, a memory for storing the predetermined number, a dialer and a controller (such as a microprocessor) coupled to receive signals from the off-hook detector and touch tone detector, to communicate with the memory and to provide command signals to the dialer. In operation, the controller responds to an off-hook condition by starting the delay period. If the delay period successfully times out, the controller reads the predetermined number from memory and enables the dialer to dial the number onto the telephone line. However, if, during the delay period, the presence of a DTMF digit or an incoming call is sensed, dialing the predetermined number onto the line is prevented. Preferably, both the predetermined number and the length of the predetermined delay period are programmable from the telephone set. The conditional autodialer may be embodied in a stand-alone unit or integrated with an individual telephone set.

18 Claims, 3 Drawing Sheets

CONDITIONAL AUTODIALER

FIELD OF THE INVENTION

This invention relates to the telephone arts and, more particularly, to a device which institutes automatic dialing of a predetermined DTMF sequence after the expiration of a predetermined period following off-hook detection.

BACKGROUND OF THE INVENTION

Under some conditions, it is difficult or impossible to dial a telephone number, and this may be particularly the case when communication is especially important. For example, a chronically ill person may experience a crisis in which it is physically impossible to dial an emergency number, even if a speed dial feature is incorporated into a given telephone. Similarly, a very young child may have an urgent need to communicate to a given number by telephone, but lacks the knowledge and/or skill to successfully dial the number or use a speed dialer.

It will therefore be understood that it would be highly desirable to provide a simple instrumentality for completing a telephone call to a predetermined number which requires a minimum of effort, knowledge or skill on the part of the person attempting to make the call. Correspondingly, if such an instrumentality renders it possible to make a call under difficult circumstances and if the receiving party has a call identification facility, the source of the call can be quickly determined and appropriate action taken, even if the calling party is not able to make any further communication whatsoever. In fact, it is possible, assuming that the facility or instrumentality for making a call with minimum effort is available, to establish a monitoring service in which it is only necessary to complete a call to the service to effect the necessary communication and to obtain an appropriate response. It is to the end of providing such an instrumentality that the present invention is directed.

OBJECTS OF THE INVENTION

It is therefore a broad object of this invention to provide an automatic conditional dialer which requires a minimum of action on the part of a caller to complete a call to a predetermined telephone number.

It is more particular an object of this invention to provide such an automatic conditional dialer which requires only that a telephone be taken off-hook, by any means, to complete a call to a predetermined number.

SUMMARY OF THE INVENTION

Briefly, these and other objects of the invention are achieved by a conditional autodialer adapted to selectively automatically dial a predetermined telephone number, after a predetermined delay period following the appearance of an on-hook to off-hook transition on the telephone line. The autodialer, in a presently preferred embodiment, includes an off-hook detector coupled to the telephone line for detecting off-hook and on-hook conditions, a touch tone detector coupled to the telephone line for detecting a DTMF tone placed on the line from the telephone set during the predetermined delay period, a memory for storing a predetermined telephone number, a dialer coupled to the telephone line and a controller (such as a microprocessor) coupled to receive signals from the off-hook detector and touch tone detector, to communicate with the memory and to provide command signals to said dialer. In operation, the controller responds to an on-hook to an off-hook transition on the line by starting a predetermined delay period such as ten seconds. If the delay period successfully times out, the controller reads the predetermined telephone number from memory and enables the dialer to dial the predetermined number onto the telephone line. However, if, during the delay period, the presence of a DTMF digit on the telephone line is sensed (indicating that conventional dialing is taking place on the line), the predetermined number is prevented from being dialed onto the line such that the conventional dialing process can be successfully completed. Optionally, a ring detector monitors the line for the presence of an incoming call during the delay period, and if an incoming call is detected, dialing the predetermined number is similarly prevented. Preferably, both the predetermined number and the length of the predetermined delay period are programmable from the telephone set. The conditional autodialer may be embodied in a stand-alone unit or integrated with an individual telephone set.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
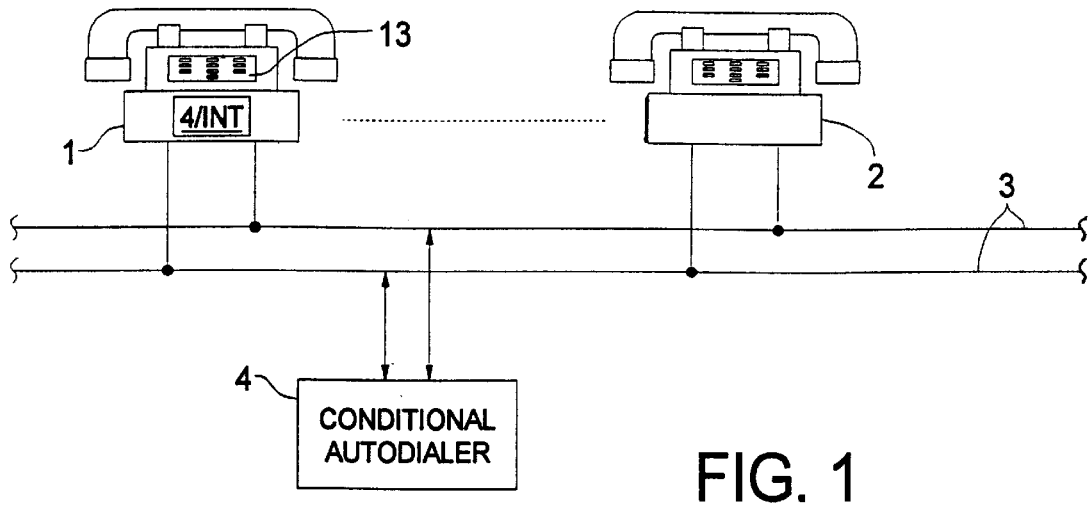
FIG. 1 illustrates a typical telephone installation in which the subject invention may be employed.

Referring first to FIG. 1, there is shown a high level block diagram of a telephone installation including the subject invention and by which the environment of the invention may be readily understood. One or more telephones, represented by telephone 1 and telephone 2, may be disposed across a local telephone line pair 3 which conventionally communicates with a telephone company central facility. Each of the telephones on the line pair 3 include a touch-tone key pad 13. In addition, a conditional autodialer circuit 4 according to the invention is coupled to the telephone line pair 3.

Figure 2:
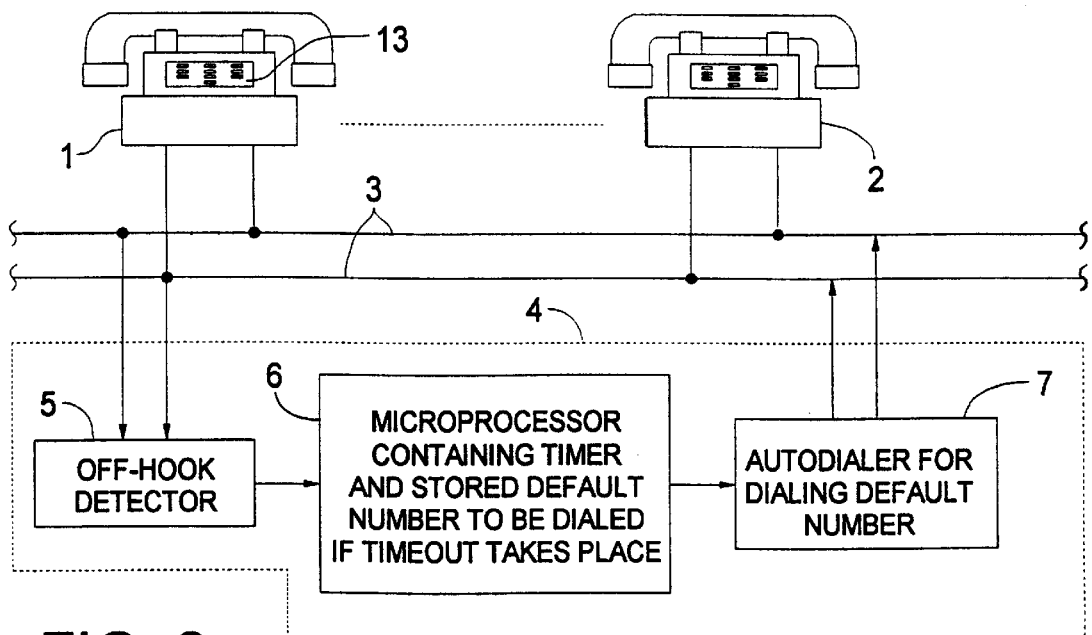
FIG. 2 is a partially schematic/partially high level block diagram of the telephone installation shown in FIG. 1.

Attention is now directed to FIG. 2 which is a mid-level block diagram of the conditional autodialer apparatus 4 of the present invention. The principal component blocks include an off-hook detector 5 connected to the telephone line pair 3, a controller such as microprocessor 6 coupled to receive signals from the off-hook detector 5 and an autodialer 7 for placing DTMF digits on the line 3 under the direction of the microprocessor 6.

Consider now the basic operation of the invention. When one of the telephones 1, 2 is taken off-hook, the conditional autodialer 4 senses this event and institutes a predetermined delay period, for example, ten seconds. If, within this predetermined delay period, a digit is conventionally dialed from the key pad 13 of the telephone, the conditional autodialer senses this second event and aborts the autodialing process such that normal dialing can proceed. If, however, the predetermined delay period times out, the conditional autodialer 4 dials a predetermined number to achieve the purpose set forth above; i.e., to complete a call by a person who cannot successfully dial a number to alert a monitoring service, etc.

Figure 3:
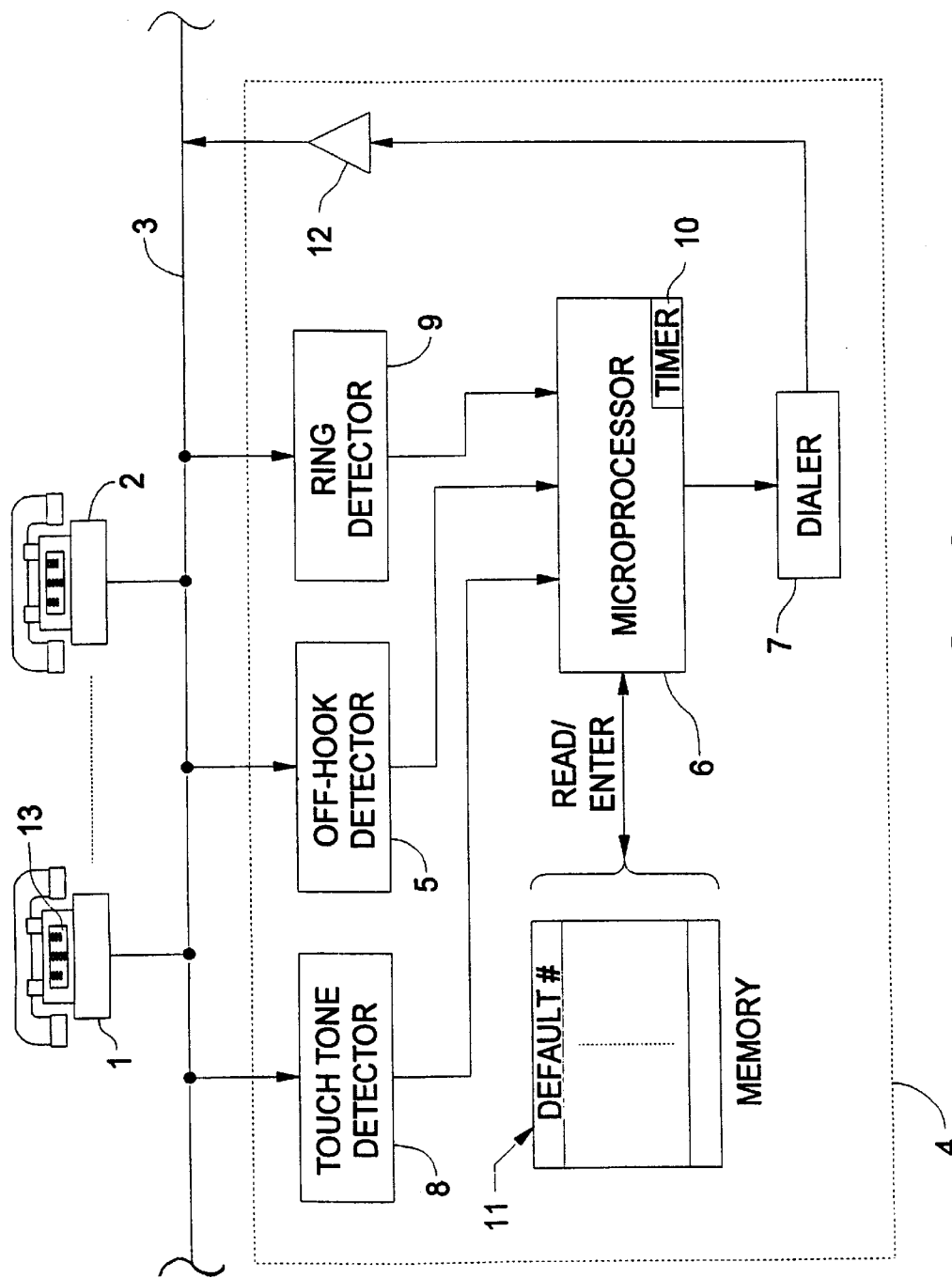
FIG. 3 a detailed block diagram of a specific embodiment of the invention.

Referring now to FIG. 3, a presently preferred embodiment of the conditional autodialer circuit 4 is shown in detail. (For convenience and clarity, the apparatus is shown single ended, it being understood that a suitable reference potential, such as local ground, is maintained throughout the local installation. Positive logic is also assumed throughout.)

Four components are connected to the line 3: the off-hook detector 5, a touch tone detector 8, a ring detector 9 and a line driver 12. The off-hook detector 5 monitors the line 3 for a voltage change (or current change or other changed condition) which reflects a change from on-hook to off-hook of a telephone on the line and provides a signal to the microprocessor 6 when that event occurs. The touch tone detector 8 conventionally senses the presence of DTMF audio tones on the line 3 which indicate that a DTMF digit has been dialed from the off-hook telephone and provides a signal to the microprocessor 6 when that event occurs. The ring detector 9 monitors the line 3 for the presence of an incoming ring on the line and provides a signal to the microprocessor 6 when that event occurs.

The microprocessor 6 includes a timer 10 (which is preferably programmable and most preferably programmable from the telephone set by entering a suitable sequence of dialed digits) and communicates with a memory 11 which, in practice, may be a programmable random access memory which is integrated with the microprocessor. The memory 11 stores, among other information, a default telephone number which may be programmed at the factory or, preferably, is conventionally entered by a user through a suitable sequence of dialed digits detected by the touch tone detector 8. The microprocessor 6 selectively sends signals to the dialer 7 which, when directed, generates the appropriate successive DTMF codes and places them on the line 3 via line driver 12.

In operation, if a normal telephone call is contemplated, one of the handsets of one of the telephones 1, 2 is taken off-hook. The off-hook detector 5 senses the change in voltage on the line 3 and responds by sending a signal to the microprocessor which initiates the timer 10. If dialing is commenced within the predetermined period (ten seconds in the example) as sensed by the touch tone decoder 8, the microprocessor 6 prevents autodialing, and the placement of the call continues normally. If, during the predetermined period, no dialing activity has taken place, but a ring signal is sensed by the ring detector 9 (indicating an incoming call), the microprocessor 6 again aborts the autodial operation so that the incoming call can be completed.

However, if neither dialing activity nor an incoming call occurs during the predetermined delay period after the off-hook condition has been sensed, when the predetermined period times out, the microprocessor 6 reads the default telephone number stored in the memory 11 and directs the dialer 7 to generate the corresponding string of DTMF signals which are placed on the line 3 via the line driver 12. Consequently, a call to the default telephone number will be made for the intended purpose.

Figure 4:
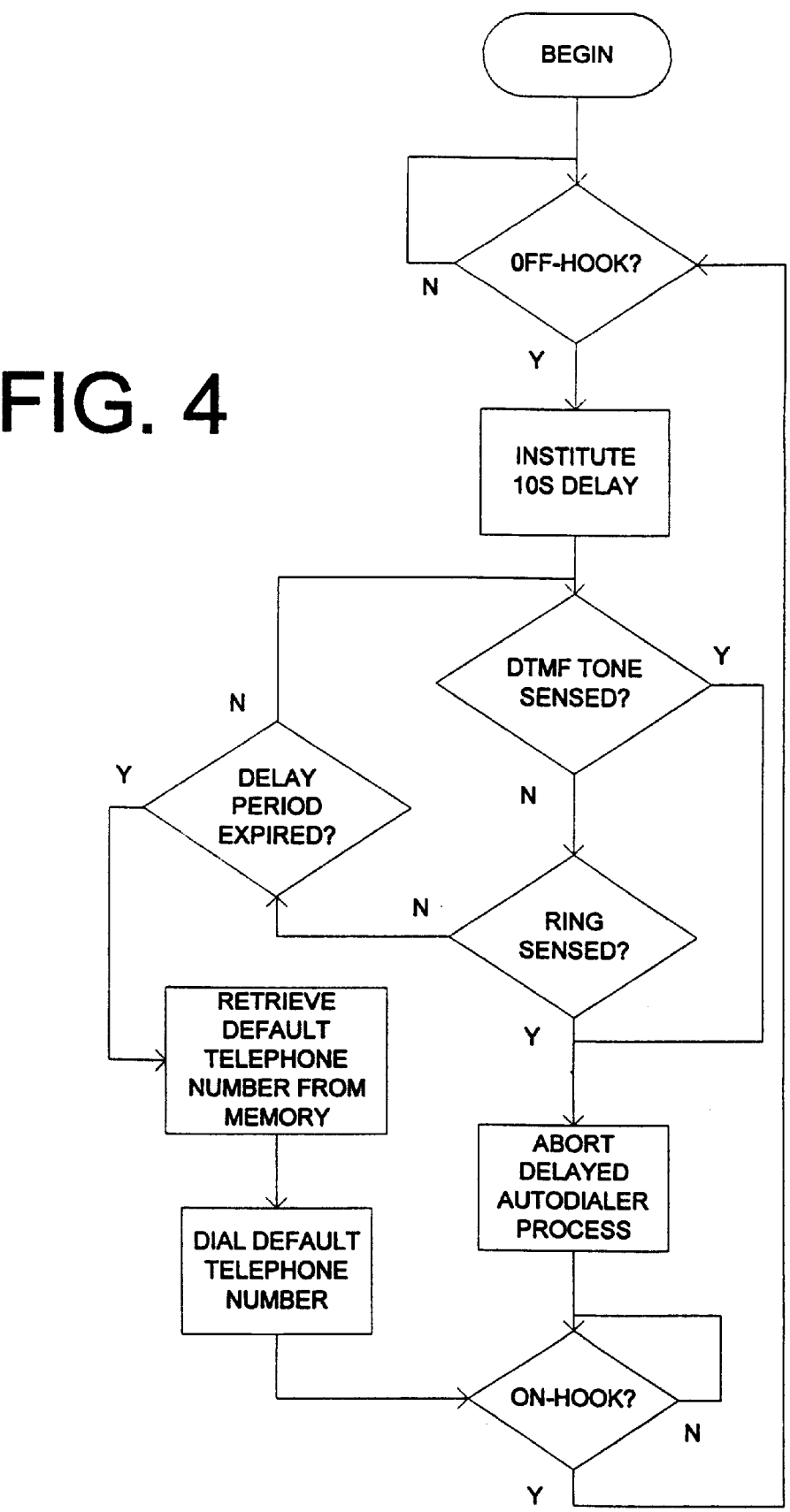
FIG. 4 is a flow chart illustrating the operation of the invention.

FIG. 4 illustrates exemplary process programming of the microprocessor 6 to effect the invention in one embodiment. The conditional autodialer, in a quiescent state, monitors the line for the appearance of a line condition change indicating that an off-hook condition is present. When an off-hook condition is detected, a predetermined delay period (e.g., ten seconds), is instituted. Then, the line is monitored for the presence of a DTMF tone which, if present, indicates that dialing has been instituted. If no DTMF tone is instantaneously present on the line, the line is further checked for the presence of a ring signal which, if present, indicates that an incoming call is available on the line. If no ring signal is on the line, a determination is made as to whether the ten second off-hook delay period has expired. If the delay period has not timed-out, the process loops back to again check for the presence of a DTMF tone.

However, if the delay period has expired, the default telephone number is read from memory and dialed to complete the conditional autodial. Thereafter, the line is monitored for an on-hook condition, indicating that the call has been completed and the telephone hung up. When this event takes place, the process again monitors the line for an off-hook condition in anticipation of the next use of the telephone line which may or may not be intended to be autodialed as described.

If, during the delay period, either a DTMF or a ring signal is sensed on the line, the delayed autodialer process is aborted such that the predetermined telephone number is not automatically dialed, and, when the line has returned to an on-hook condition, the process again monitors the telephone line for the presence of an off-hook condition.

It will be understood that, in order to automatically dial a predetermined number according to the invention, it is only necessary to take the telephone off-hook, by any physical or electronic means and wait for a brief period (provided to transparently accommodate normal dialing) to expire whereupon the predetermined number will be automatically dialed. This result can be achieved by, if possible, removing or knocking the telephone hand set to an off-hook condition. In an extreme instance, for example, this may be accomplished even by pulling the telephone instrument cord until the telephone falls to the floor. If the predetermined number is that of a monitoring service, its telephone number identification device will display the calling number such that the service can identify the calling party and take appropriate action which, itself, may be predetermined. For example, the predetermined action may be to immediately dispatch an ambulance to the calling party. A small child, unable to accurately dial a telephone number, but able to communicate verbally if a call can be completed, only need to undertake the simple act of picking up the hand set and waiting until the predetermined time period has expired whereupon the predetermined number is automatically dialed. It has been found that children as young as three years old can readily carry out this task.

While the invention has been described as a separate device, it will be readily apparent to those skilled in the art that the invention is equally adaptable to integration into a telephone set. Referring briefly again to FIG. 1, such an integral installation is represented by the box 4/INT disposed within telephone 1. This arrangement has the advantage, for appropriate installations, that the conditional autodialer feature may be isolated to one or more selected telephones on a given telephone line pair 3 while other telephones on the same line pair are not affected.

Thus, while the principles of the invention have now been made (clear in illustrative embodiments, there will be immediately obvious to the those skilled in the art many modifications of structure and components used in the practice of the invention which are particularly adapted for specific environments and operating requirements without departing from those principles.

What is claimed is:

1. A conditional autodialer adapted to selectively automatically dial a predetermined telephone number on a telephone line including at least one telephone set, after a predetermined delay period following an on-hook to off-hook transition on the telephone line, said conditional autodialer comprising:

A) an off-hook detector coupled to the telephone line for detecting off-hook and on-hook conditions thereon;

B) a touch tone detector coupled to the telephone line for detecting a DTMF tone placed on the line during the predetermined delay period;

C) memory means for storing a predetermined telephone number;

D) a dialer coupled to the telephone line; and

E) a controller coupled to receive signals from said off-hook detector and said touch tone detector, to communicate with said memory and to provide signals to said dialer, said controller being adapted to:

1) respond to an on-hook to an off-hook transition on the telephone line for instituting a predetermined delay period;

2) respond to time-out of the predetermined delay period by reading the predetermined telephone number from said memory and enabling said dialer to dial the predetermined number onto the telephone line; and 3) respond to a DTMF digit placed on the telephone line during the predetermined delay period by preventing the performance of response E)2).

2. The conditional autodialer of claim 1 which further includes a ring detector coupled to the telephone line for detecting an incoming call on the line during the predetermined time period and in which said controller is coupled to receive signals from said ring detector and is further adapted to respond to an incoming call sensed on the telephone line during the predetermined time period by preventing the performance of response E)2).

3. The conditional autodialer of claim 1 in which the predetermined telephone number stored in said memory means is programmable from the telephone set.

4. The conditional autodialer of claim 2 in which the predetermined telephone number stored in said memory means is programmable from the telephone set.

5. The conditional autodialer of claim 1 in which the predetermined delay period is programmable from the telephone set.

6. The conditional autodialer of claim 2 in which the predetermined delay period is programmable from the telephone set.

7. The conditional autodialer of claim 3 in which the predetermined delay period is programmable from the telephone set.

8. The conditional autodialer of claim 3 in which the predetermined delay period is programmable from the telephone set.

9. The conditional autodialer of claim 1 which is integral with the telephone set.

10. The conditional autodialer of claim 2 which is integral with the telephone set.

11. The conditional autodialer of claim 3 which is integral with the telephone set.

12. The conditional autodialer of claim 4 which is integral with the telephone set.

13. The conditional autodialer of claim 5 which is integral with the telephone set.

14. The conditional autodialer of claim 6 which is integral with the telephone set.

15. The conditional autodialer of claim 7 which is integral with the telephone set.

16. The conditional autodialer of claim 8 which is integral with the telephone set.

17. A method for conditionally automatically dialing a predetermined telephone number on a telephone line including at least one telephone set comprising the steps of:

A) monitoring the telephone line for an off-hook condition;

B) if an off-hook condition is detected, instituting a delay period of predetermined length;

C) during the delay period, monitoring the telephone line for the presence of a DTMF tone;

D) if a DTMF tone is sensed on the telephone line during the delay period, aborting the process for conditionally automatically dialing the predetermined telephone number; and E) if a DTMF tone is not sensed on the telephone line during the delay period, automatically dialing the predetermined telephone number after the delay period has expired.

18. A method for conditionally automatically dialing a predetermined telephone number on a telephone line including at least one telephone set comprising the steps of:

A) monitoring the telephone line for an off-hook condition;

B) if an off-hook condition is detected, instituting a delay period of predetermined length;

C) during the delay period, monitoring the telephone line for the presence of a DTMF tone and the presence of a ring signal;

D) if a DTMF tone or a ring signal is sensed on the telephone line during the delay period, aborting the process for conditionally automatically dialing the predetermined telephone number; and E) if neither a DTMF tone nor a ring signal is sensed on the telephone line during the delay period, automatically dialing the predetermined telephone number after the delay period has expired.

* * * * *